(12) United States Patent
Saito

(10) Patent No.: US 8,103,432 B2
(45) Date of Patent: Jan. 24, 2012

(54) INTERNAL-COMBUSTION-ENGINE CONTROL APPARATUS

(75) Inventor: Toshikatsu Saito, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 676 days.

(21) Appl. No.: 12/244,264

(22) Filed: Oct. 2, 2008

(65) Prior Publication Data

US 2009/0287398 A1 Nov. 19, 2009

(30) Foreign Application Priority Data

May 14, 2008 (JP) .................................. 2008-127359

(51) Int. Cl.
*F02P 5/15* (2006.01)
*F02D 41/24* (2006.01)

(52) U.S. Cl. .............. 701/111; 123/406.34; 123/406.38; 123/406.43

(58) Field of Classification Search .................. 701/111; 123/406.21, 406.29, 406.34, 406.37, 406.38, 123/406.43, 406.22, 406.42
See application file for complete search history.

(56) References Cited

U.S. PATENT DOCUMENTS

| 4,316,440 | A | * | 2/1982 | Yamaguchi et al. | ......... | 73/35.09 |
| 4,319,480 | A | * | 3/1982 | Yamaguchi et al. | ......... | 73/35.03 |
| 4,341,189 | A | * | 7/1982 | Yamaguchi et al. | ......... | 73/35.09 |
| 4,345,558 | A | * | 8/1982 | Yamaguchi et al. | ..... | 123/406.35 |
| 4,409,816 | A | * | 10/1983 | Yamaguchi et al. | ......... | 73/35.09 |
| 4,465,047 | A | * | 8/1984 | Yamaguchi et al. | ......... | 73/35.09 |
| 4,549,514 | A | * | 10/1985 | Abe et al. | .................. | 123/406.39 |
| 6,105,552 | A | * | 8/2000 | Arisawa et al. | .......... | 123/406.37 |
| 6,557,527 | B2 | * | 5/2003 | Miyaji | ..................... | 123/406.36 |
| 7,788,022 | B2 | * | 8/2010 | Hagari | .......................... | 701/111 |

FOREIGN PATENT DOCUMENTS

| JP | 60-104776 | | * | 6/1985 |
| JP | 04-326036 | A | | 11/1992 |
| JP | 3093467 | B2 | | 7/2000 |
| JP | 3471034 | B2 | | 9/2003 |
| JP | 2005-090250 | A | | 4/2005 |

\* cited by examiner

*Primary Examiner* — Hai Huynh
(74) *Attorney, Agent, or Firm* — Sughrue Mion, PLLC

(57) ABSTRACT

Knocking control is performed using a data group of serial segments each including a predetermined number of values obtained by A/D-converting a signal that appears within a knocking detection window and a data group consisting of serial segments each including the predetermined number of values. The starting timing is shifted and a time-frequency analysis is applied to the data groups in a plurality of frequency bandwidths. Peak values and integration values of spectrums, within the knocking detection window, outputted after the time-frequency analysis in each of the frequency bandwidths are calculated. A P/H method is performed based on the peak value in each of the frequency bandwidths and an integration method is performed based on the integration value in each of the frequency bandwidths for a knocking determination. If knocking is detected through at least one of the methods, the ignition timing is delayed in order to avoid the knocking.

10 Claims, 5 Drawing Sheets

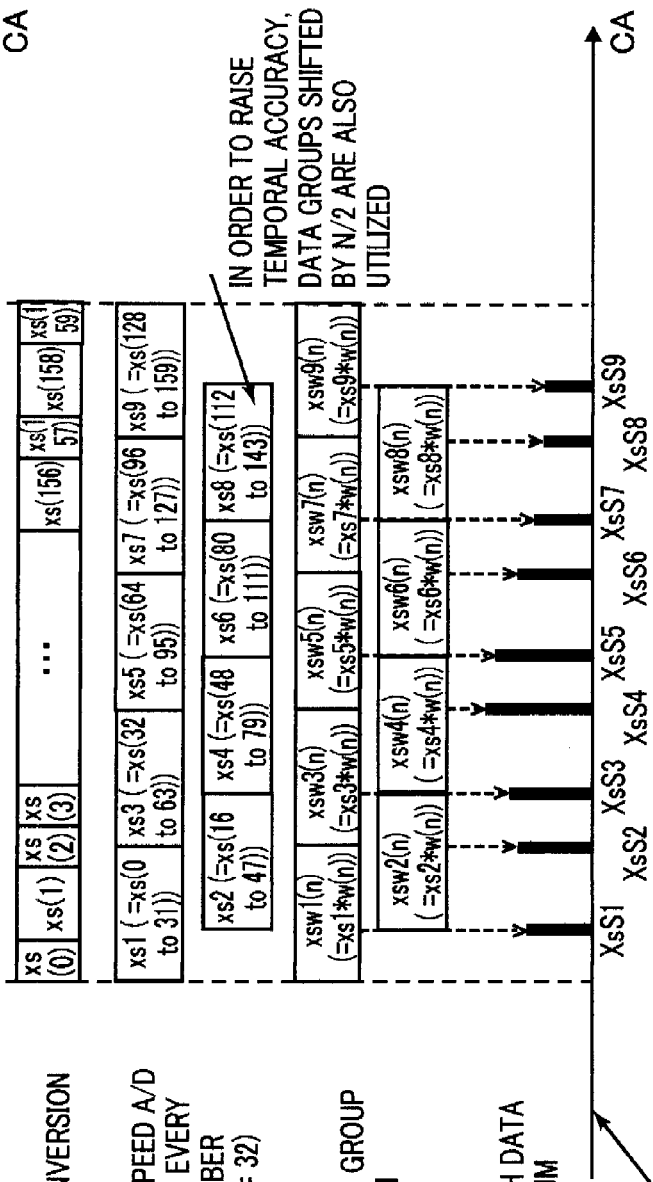

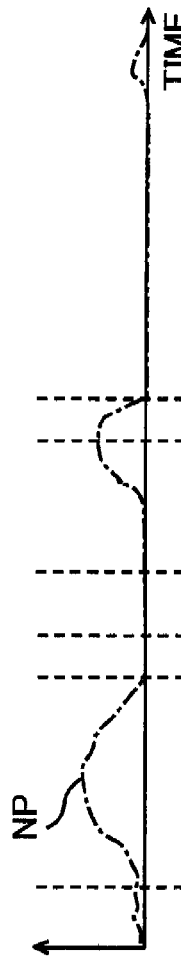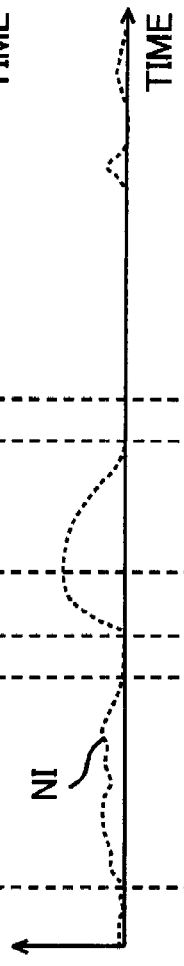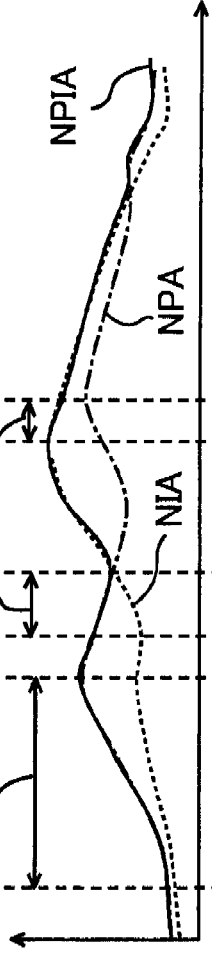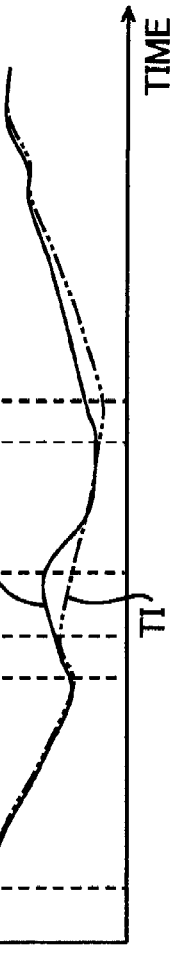
FIG.4A KNOCKING DETECTION AMOUNT (CALCULATED BASED ON PEAK VALUE)
FIG.4B KNOCKING DETECTION AMOUNT (CALCULATED BASED ON INTEGRATION VALUE)
FIG.4C KNOCKING DELAY ANGLE AMOUNT
FIG.4D IGNITION TIMING (AFTER KNOCKING DELAY ANGLE AMOUNT APPLIED)

ns in the frequency bandwidths, the behavior of the knocking delay angle amount is represented by the dashed line NPA in FIG. 4C; in contrast, in the case of the knocking detection amount NI calculated based on the integration values of the respective spectrums in the frequency bandwidths, the behavior of the knocking delay angle amount is represented by the broken line NIA in FIG. 4C. In other words, in the case where the knocking detection amount NP or NI is larger than zero, it is determined that there exists knocking, and the knocking delay angle amount increases.

INTERNAL-COMBUSTION-ENGINE CONTROL APPARATUS

BACKGROUND OF THE INVENTION

1. Field of the Invention

The present invention relates to an internal-combustion-engine control apparatus that controls knocking caused by a pressure wave produced through self-ignition of an end gas in a cylinder of an internal combustion engine.

2. Description of the Related Art

When knocking occurs in an internal combustion engine (referred to as an engine, hereinafter), a vibration having a characteristic resonance frequency component occurs. Accordingly, by detecting the vibration, the occurrence of knocking can be determined. To date, an apparatus has been proposed (for example, Japanese Patent Publication No. 3471034) in which the AD-converted value of a knocking sensor signal outputted from a knocking sensor is divided every predetermined number in a plurality of frequency bandwidths and undergoes a fast Fourier transformation (referred to as an FFT, hereinafter) so that respective spectrums, in the frequency bandwidths, within a knocking detection window are calculated, the peak values in the respective spectrums in the frequency bandwidths are calculated, and then knocking control is performed based on the peak values.

Additionally, an apparatus has been proposed (for example, Japanese Patent Publication No. 3093467) in which the AD-converted value of a knocking sensor signal outputted from a knocking sensor is divided every predetermined number in a plurality of frequency bandwidths and undergoes an FFT, so that respective spectrums, in the frequency bandwidths, within a knocking detection window are calculated, the integration values of the spectrums in the frequency bandwidths are calculated, and then knocking control is performed based on the integration values.

FIGS. 4A to 4B are explanatory graphs for explaining the foregoing conventional apparatus; FIG. 4A represents the behavior of a knocking detection amount calculated based on the respective peak values in the frequency bandwidths; FIG. 4B represents the behavior of a knocking detection amount calculated based on the respective integration values in the frequency bandwidths; FIG. 4C represents the behavior of a knocking delay angle amount; FIG. 4D represents the behavior of an ignition timing after a knocking delay amount has been applied. A knocking detection amount NP represented in FIG. 4A is calculated as a value obtained by subtracting the peak value in the spectrum of the knocking sensor signal from a predetermined threshold value (in this regard however, in the case where the value obtained by subtracting a peak value in the spectrum of the knocking sensor signal from a predetermined threshold value becomes a negative value, the knocking detection amount NP is regarded as zero); a knocking detection amount NI represented in FIG. 4B is calculated as a value obtained by subtracting the integration value of the knocking sensor signal from a predetermined threshold value (in this regard however, in the case where the value obtained by subtracting an integration value of the knocking sensor signal from a predetermined threshold value becomes a negative value, the knocking detection amount NI is regarded as zero).

In the case where the knocking detection amount is larger than zero, the knocking delay angle amount is updated toward the delayed angle side (a side where the knocking delay angle amount increases) in proportion to the knocking detection amount; in the case of the knocking detection amount NP calculated based on the peak values of the respective spectrums in the frequency bandwidths, the behavior of the knocking delay angle amount is represented by the dashed line NPA in FIG. 4C; in contrast, in the case of the knocking detection amount NI calculated based on the integration values of the respective spectrums in the frequency bandwidths, the behavior of the knocking delay angle amount is represented by the broken line NIA in FIG. 4C. In other words, in the case where the knocking detection amount NP or NI is larger than zero, it is determined that there exists knocking, and the knocking delay angle amount increases.

In the case where the conventional technologies disclosed in Japanese Patent Publication No. 3471034 and Japanese Patent Publication No. 3093467 are utilized simply in combination with each other, i.e., in the case where the knocking detection amount NP and the knocking detection amount NI are utilized simply in combination with each other, the behavior of the knocking delay angle amount is represented by the solid line NPIA in FIG. 4C.

In the case where the knocking detection amount is zero, it is determined that there exists no knocking, and each time a knocking-free period exceeds predetermined duration, the knocking delay angle amount is updated toward the advanced angle side (a side where the knocking delay angle amount decreases). Additionally, as represented in the duration C in each of FIGS. 4A to 4C, the knocking detection amount NP calculated based on the peak value and the knocking delay angle amount NI calculated based on the integration value differ from each other in amplitude. The reason why the knocking detection amount NP and the knocking delay angle amount NI differ from each other in amplitude is that the values of the peak value and the integration value differ from each other and the respective predetermined threshold values differ from each other; as a result, as represented in FIG. 4C, the knocking delay angle amount NPA and the knocking delay angle amount NIA differ from each other in amplitude.

Here, close attention will be paid to the behaviors of the knocking delay angle amounts during the duration A and the duration B in FIG. 4C. In the first place, because, during the duration A, the knocking detection amount NI calculated based on the integration value is larger than zero, the knocking delay angle amount NIA calculated based on the integration value increases, and because the knocking detection amount NP calculated based on the peak value is zero, the knocking delay angle amount NPA calculated based on the peak value decreases. In this regard however, during the duration A, the knocking delay angle amount NPA calculated based on the peak value is larger than the knocking delay angle amount NIA calculated based on the integration value. During the duration A, it is determined based on the integration value that there exists knocking; therefore, it is required to increase the knocking delay angle amount so as to avoid the knocking.

However, in the case where the foregoing conventional technologies are utilized simply in combination with each other and knocking control is performed based on the knocking delay angle amount, out of the knocking delay angle amounts calculated in accordance with both conventional technologies, which is larger than the other, the knocking delay angle amount NPA calculated based on the peak value is selected, and the knocking delay angle amount NPIA decreases, even though it is determined during the duration A that there exists knocking; as a result, as represented in FIG. 4D, in the case where the conventional technologies are utilized simply in combination with each other, the ignition timing (after the knocking delay angle amount has been applied) is controlled toward the advanced angle side, even though it is determined during the duration A that there exists knocking.

In addition, in FIG. 4D, the curve TP represents the behavior of the ignition timing obtained after the knocking delay angle amount has been applied in the case where the foregoing conventional technologies are utilized simply in combination with each other; the curve TI represents the behavior of the ignition timing obtained after the knocking delay angle amount has been applied in the case where the present invention described later is utilized.

Because, during the duration B in FIG. 4C, the knocking detection amount NP calculated based on the peak value is larger than zero, the knocking delay angle amount NPA calculated based on the peak value increases, and because the knocking detection amount NI calculated based on the integration value is zero, the knocking delay angle amount NIA calculated based on the integration value decreases. In this regard however, during the duration B, the knocking delay angle amount NIA calculated based on the integration value is larger than the knocking delay angle amount NPA calculated based on the peak value. As described above, during the duration B, it is determined based on the peak value that there exists knocking; therefore, it is required to increase the knocking delay angle amount so as to avoid the knocking.

However, in the case where the conventional technologies are utilized simply in combination with each other and knocking control is performed based on the knocking delay angle amount, out of two knocking delay angle amounts calculated in accordance with both technologies, which is larger than the other, as represented in FIG. 4C, the knocking delay angle amount NIA calculated based on the integration value is selected, and during the duration B, the knocking delay angle amount NPIA decreases, even though it is determined that there exists knocking; as a result, as represented in FIG. 4D, in the case where the conventional technologies are utilized simply in combination with each other, as is the case with the duration A, the ignition timing TP obtained after the knocking delay angle amount has been applied is controlled toward the advanced angle side, even though it is determined that there exists knocking. As described above, in the case where the foregoing conventional technologies are utilized simply in combination with each other, appropriate knocking control may not be performed.

As well known by those skilled in the art, depending on the shape of an engine block, the shape of a cylinder, the opening/closing timings of an air-intake valve and an exhaust gas valve, the difference in an fuel injection system, and the like, a vibration due to knocking and vibrations due to various kinds of noise signals change; thus, as disclosed in Japanese Patent Publication No. 3471034, there exists an engine in which knocking detectability is enhanced by performing knocking control on the basis of the peak values of the spectrums in the frequency bandwidths, or as disclosed in Japanese Patent Publication No. 3093467, there exists an engine in which knocking detectability is enhanced by performing knocking control on the basis of the integration values of the spectrums in the frequency bandwidths.

Moreover, even in the same engine, depending on a driving condition, knocking detectability is enhanced by performing knocking control on the basis of the peak values of the spectrums in the frequency bandwidths, or knocking detectability is enhanced by performing knocking control on the basis of the integration values of the spectrums in the frequency bandwidths. In other words, with such conventional technologies as disclosed in Japanese Patent Publications No. 3471034 and No. 3093467, an engine with low knocking detectability may be manufactured or a driving condition in which knocking detectability is low may occur.

Still moreover, in the case where such a conventional technology as disclosed in Japanese Patent Publication No. 3471034 and such a conventional technology as disclosed in Japanese Patent Publication No. 3093467 are utilized simply in combination with each other and knocking control is performed on the basis of the knocking delay angle amount (i.e., the amount of an angle by which the ignition timing is delayed in order to avoid knocking), out of the knocking delay angle amounts calculated in accordance with both technologies, which is larger than the other, the knocking delay angle amount calculated based on the integration value is selected in a certain duration, and the knocking delay angle amount decreases, even though it is determined that there exists knocking; thus, the ignition timing obtained after the knocking delay angle amount has been applied is controlled toward the advanced angle side, whereby appropriate knocking control may not be performed.

SUMMARY OF THE INVENTION

The present invention has been implemented in order to solve the foregoing problems in the conventional apparatuses; the objective thereof is to provide an internal-combustion-engine control apparatus in which knocking detectability is enhanced not only regardless of the type of an engine but also regardless of the difference in a driving condition so that appropriate knocking control can be performed.

An internal-combustion-engine control apparatus according to the present invention is provided with a sensor that detects a vibration of an engine or a cylinder inner pressure vibration and outputs a signal in accordance with the vibration; a second signal processing unit that forms a first data group consisting of serial segments each including a predetermined number of digital values that are obtained by A/D-converting the signal outputted from the sensor and a second data group consisting of serial segments each including the predetermined number of digital values, the starting timing of each serial segment in the second data group being shifted from that of each serial segment in the first data group by a predetermined amount, and that applies respective time-frequency analysis processings to the first data group and the second data group in each of a plurality of frequency bandwidths so as to output spectrums based on the respective processings; a knocking determination unit that performs knocking determination based on the respective peak values of the spectrums outputted from the signal processing unit; and a knocking determination unit that performs knocking determination based on the respective integration values of the spectrums outputted from the signal processing unit. The internal-combustion-engine control apparatus is configured in such a way that, in the case where knocking is detected by at least one of the knocking determination unit that performs knocking determination based on the respective peak values and the knocking determination unit that performs knocking determination based on the respective integration values, an ignition timing for the engine is delayed.

In the present invention, the knocking determination unit that performs knocking determination based on the respective integration values performs knocking determination, based on the average value of the spectrums.

An internal-combustion-engine control apparatus according to the present invention is preferably configured in such a way that the knocking determination unit that performs knocking determination based on the respective peak values of the spectrums compares the peak values with a predetermined threshold value in each of the frequency bandwidths so as to calculate a knocking detection amount, and calculates a delay angle amount for each ignition of the engine in each of the frequency bandwidths, based on the calculated knocking detection amount; the knocking determination unit that performs knocking determination based on the respective integration values of the spectrums compares the integration values with a predetermined threshold value in each of the frequency bandwidths so as to calculate a knocking detection amount, and calculates a delay angle amount for each ignition of the engine in each of the frequency bandwidths, based on the calculated knocking detection amount; and knocking of the engine is controlled to be suppressed, based on the delay angle amount, among the respective delay angle amounts for each ignition calculated by the knocking determination units, that is maximal.

An internal-combustion-engine control apparatus according to the present invention is preferably configured in the following manner:

The signal processing unit forms the first data group consisting of serial segments each including a predetermined number of digital values that are obtained by A/D-converting the signal outputted from the sensor and the second data group consisting of serial segments each including the predetermined number of digital values, the starting timing of each serial segment in the second data group being shifted from that of each serial segment in the first data group by a predetermined amount, and includes a first signal processing unit that applies respective time-frequency analysis processings to the first data group and the second data group in a first frequency bandwidth so as to output spectrums based on the respective processings; and a second signal processing unit that forms a first data group consisting of serial segments each including a predetermined number of digital values that are obtained by A/D-converting the signal outputted from the sensor and a second data group consisting of serial segments each including the predetermined number of digital values, the starting timing of each serial segment in the second data group being shifted from that of each serial segment in the first data group by a predetermined amount, and that applies respective time-frequency analysis processings to the first data group and the second data group in a second frequency bandwidth so as to output spectrums based on the respective processings. The knocking determination unit that performs knocking determination based on the respective peak values includes a first knocking determination unit that performs knocking determination based on the respective peak values of the spectrums outputted from the first signal processing unit; and a second knocking determination unit that performs knocking determination based on the respective peak values of the spectrums outputted from the second signal processing unit. The knocking determination unit that performs knocking determination based on the respective integration values includes a third knocking determination unit that performs knocking determination based on the respective integration values of the spectrums outputted from the first signal processing unit; and a fourth knocking determination unit that performs knocking determination based on the respective integration values of the spectrums outputted from the second signal processing unit.

Moreover, an internal-combustion-engine control apparatus according to the present invention is preferably configured in the following manner:

The knocking determination unit that performs knocking determination based on the respective peak values includes a first delay angle amount calculation unit that compares the respective peak values of the spectrums outputted from the first signal processing unit with a predetermined threshold value so as to calculate a knocking detection amount, and calculates a delay angle amount for each ignition of the engine in the first frequency bandwidth, based on the calculated knocking detection amount; and a third delay angle amount calculation unit that compares the respective peak values of the spectrums outputted from the second signal processing unit with a predetermined threshold value so as to calculate a knocking detection amount, and calculates a delay angle amount for each ignition of the engine in the second frequency bandwidth, based on the calculated knocking detection amount. The knocking determination unit that performs knocking determination based on the respective integration values includes a second delay angle amount calculation unit that compares the respective integration values of the spectrums outputted from the first signal processing unit with a predetermined threshold value so as to calculate a knocking detection amount, and calculates a delay angle amount for each ignition of the engine in the first frequency bandwidth, based on the calculated knocking detection amount; and a fourth delay angle amount calculation unit that compares the respective integration values of the spectrums outputted from the second signal processing unit with a predetermined threshold value so as to calculate a knocking detection amount, and calculates a delay angle amount for each ignition of the engine in the second frequency bandwidth, based on the calculated knocking detection amount.

Still moreover, an internal-combustion-engine control apparatus according to the present invention is preferably configured in such a way that knocking of the engine is controlled to be suppressed, based on the delay angle amount, among the respective delay angle amounts for each ignition calculated by the knocking determination units, that is maximal.

An internal-combustion-engine control apparatus according to the present invention is preferably configured in such a way that the A/D conversion is applied to a portion, of the signal outputted from the sensor, within a predetermined knocking detection window.

An internal-combustion-engine control apparatus according to the present invention is preferably configured in such a way that the time-frequency analysis processing in each of the frequency bandwidths is applied to the A/D-converted signal, through a discrete Fourier transformation.

Furthermore, an internal-combustion-engine control apparatus according to the present invention is preferably configured in such a way that the knocking determination unit that performs knocking determination based on the respective integration values performs knocking determination, based on the average value of the spectrums.

Moreover, an internal-combustion-engine control apparatus according to the present invention is preferably configured in such a way that the predetermined threshold value to be compared with the peak value and the predetermined threshold value to be compared with the integration value are calculated based on coefficients that are changed in accordance with a driving condition of the engine, and the coefficients are set in such a way that the threshold values become maximal for a frequency bandwidth in which an erroneous knocking detection is frequently made.

In an internal-combustion-engine control apparatus according to the present invention, knocking detectability can be enhanced, regardless of the type of an engine, even though there exist some engines whose knocking detectability is raised when knocking control is performed based on the peak value of the spectrums in each of the frequency bandwidths, and there exist other engines whose knocking detectability is raised when knocking control is performed based on the integration value of the spectrums in each of the frequency bandwidths; furthermore, regardless of a driving condition, knocking detectability can be enhanced.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 2 is an explanatory chart representing a specific example of a time-frequency analysis according to Embodiment 1 of the present invention;

FIGS. 4A to 4D are explanatory charts for explaining a conventional apparatus.

DETAILED DESCRIPTION OF THE PREFERRED EMBODIMENTS

Embodiment 1

An internal-combustion-engine control apparatus according to Embodiment 1 of the present invention will be explained in detail below, with reference to the accompanying drawings.

Figure 1A:
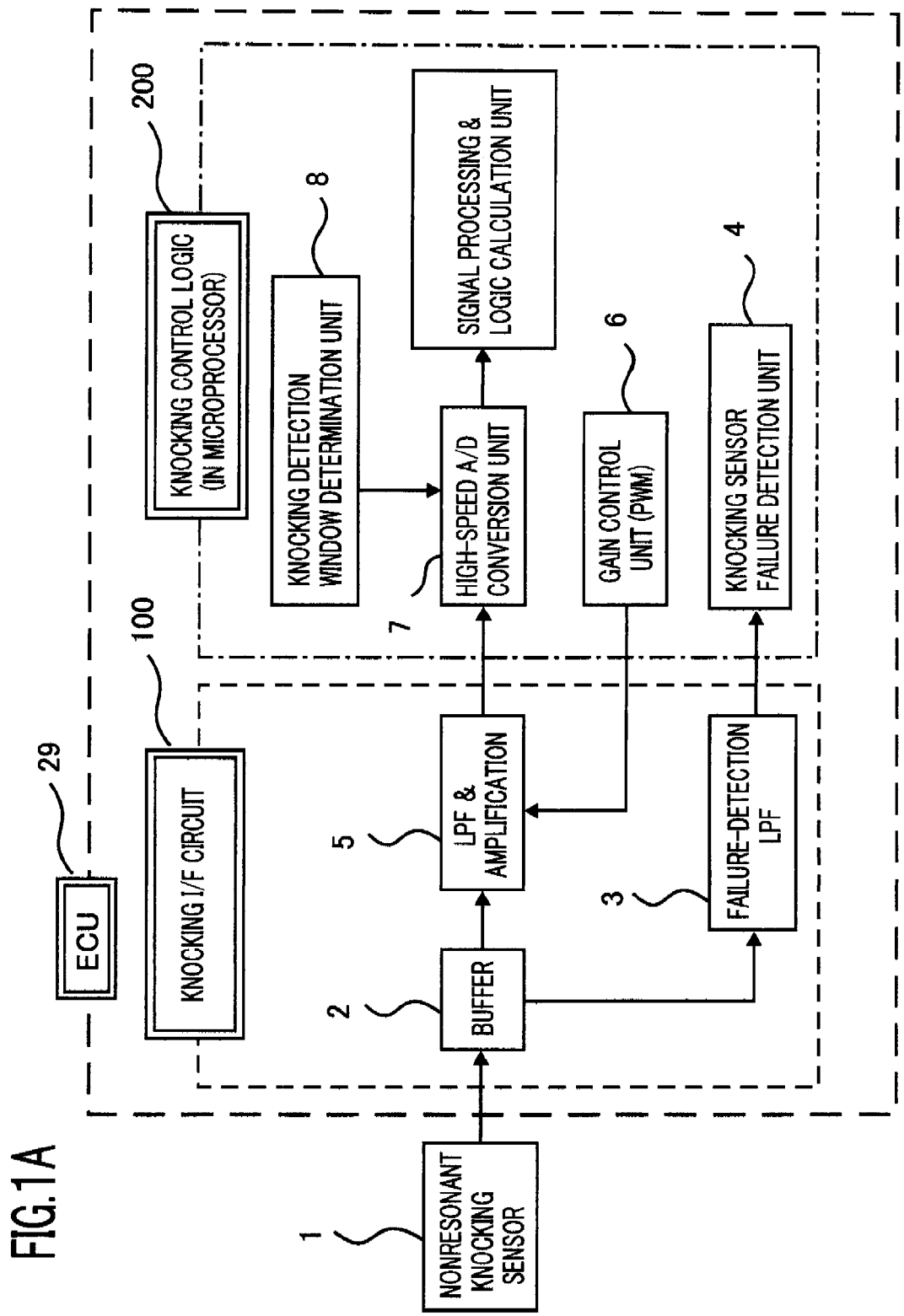
FIGS. 1A and 1B are block diagrams illustrating the system configuration of a knocking control unit in an internal-combustion-engine control apparatus according to Embodiment 1 of the present invention.
Figure 1B:
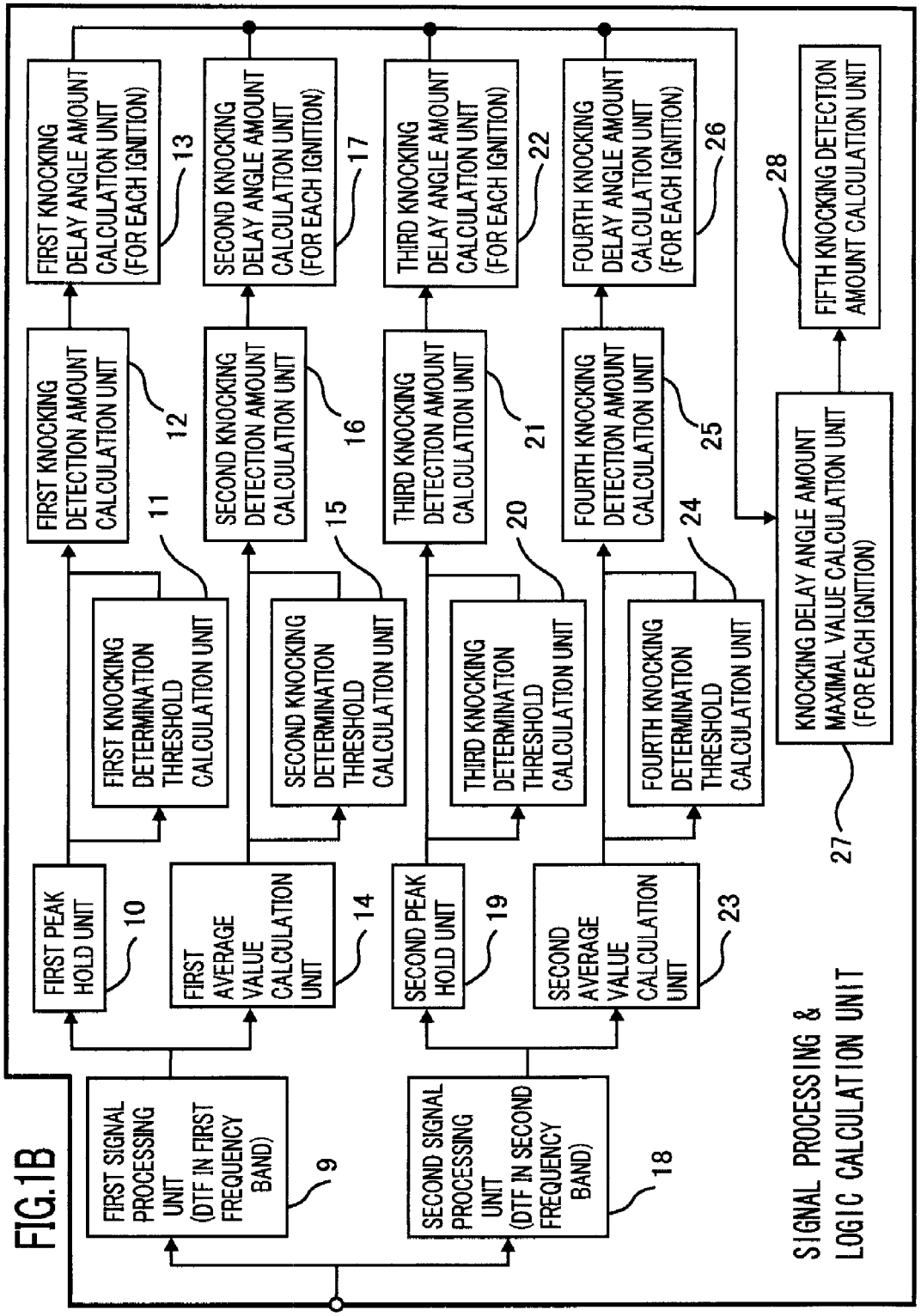

FIGS. 1A and 1B are block diagrams illustrating the system configuration of a knocking control unit in an internal-combustion-engine control apparatus according to Embodiment 1 of the present invention. The knocking control unit illustrated in FIGS. 1A and 1B is configured with a nonresonant knocking sensor 1 that is formed of, for example, a piezoelectric element and mounted on an engine; and an electronic control unit (referred to as an ECU, hereinafter) 29 that applies various kinds of processing items to an analogue signal from the nonresonant knocking sensor 1 and eventually calculates a knocking delay angle amount. In addition, in place of the nonresonant knocking sensor 1, a sensor, such as a cylinder inner pressure sensor, that detects an engine vibration or a cylinder inner pressure vibration may be utilized.

Next, the configuration of a system in the ECU 1 will be explained. The analogue signal outputted from the nonresonant knocking sensor 1 is transmitted to a buffer 2. The analogue signal outputted from the buffer 2 is transmitted to an anti-alias lowpass filter (referred to as an anti-alias LPF, hereinafter) 5 and a failure-detection lowpass filter (referred to as a failure-detection LPF, hereinafter) 3. The failure-detection LPF 3 attenuates the AC components of the analogue signal that has been pulled up and pulled down in the buffer 2 and inputs the analogue signal to a knocking sensor failure detection unit 4. The knocking sensor failure detection unit 4 monitors a DC voltage outputted from the failure-detection LPF 3 so as to detect a failure in the nonresonant knocking sensor 1.

In contrast, the anti-alias LPF 5 applies anti-alias processing to the analogue signal and then amplifies the analogue signal through a switched resistor. In addition, the foregoing switched resistor is PWM-controlled through a PWM control signal, from a gain control unit 6, that is generated in accordance with the rotation speed of the engine.

The buffer 2, the failure-detection LPF 3, and the anti-alias LPF 5 configure a knocking interface circuit (referred to as a knocking I/F circuit, hereinafter) 100.

Next, a knocking control logic 200 connected to the knocking I/F circuit 100 will be explained.

The knocking control logic 200 is disposed in a microprocessor of the ECU 29 and provided with a configuration and a function described below.

In the knocking control logic 200, a high-speed A/D conversion unit 7 applies a high-speed A/D conversion to the analogue signal that has been processed by the anti-alias LPF 5. The foregoing high-speed A/D conversion is performed during a low-level duration of a knocking detection window signal generated by a knocking detection window determination unit 8. After the execution of the high-speed A/D conversion by the high-speed A/D conversion circuit 7, a time-frequency analysis is applied to the A/D-converted data. In Embodiment 1 of the present invention, the following explanation is made assuming that a time-frequency analysis is performed with respect to two frequency bandwidths (e.g., 6.25 [kHz] and 15.63 [kHz]); however, the number of frequencies and the frequency bandwidths with respect to which the analysis is performed are not limited to the two frequencies and the two frequency bandwidths. In the following explanation, one (e.g., 6.25 [kHz]) of the two frequency bandwidths is referred to as a first frequency bandwidth, and the other one (e.g., 15.63 [kHz]) is referred to as a second frequency bandwidth.

In a first signal processing unit 9, a time-frequency analysis in the first frequency bandwidth is performed, through a discrete Fourier transformation (referred to as a DTF, hereinafter), on the data obtained after the execution of a high-speed A/D conversion by the high-speed A/D conversion circuit 7, in steps of a predetermined number of data pieces. In a second signal processing unit 18, a time-frequency analysis in the second frequency bandwidth is performed, through a discrete Fourier transformation (referred to as a DFT, hereinafter), on the data obtained after the execution of a high-speed A/D conversion by the high-speed A/D conversion circuit 7, in steps of a predetermined number of data pieces. In addition, in Embodiment 1 of the present invention, as the time/frequency analyses performed in the first signal processing unit 9 and the second signal processing unit 18, a DFT is performed, as described later, on the data obtained after the execution of a high-speed A/D conversion by the high-speed A/D conversion circuit 7, in steps of a predetermined number of data pieces; however, the time-frequency analysis is not limited to the DFT.

Next, the DFT, which is performed, in steps of a predetermined number of data pieces, in the first signal processing unit 9 and the second signal processing unit 18, will be explained. FIG. 2 is an explanatory chart representing a specific example of a time-frequency analysis according to Embodiment 1 of the present invention; a specific example is represented in which the signal outputted from the anti-alias LPF 5 is processed by the high-speed A/D conversion 7 and the knocking detection window determination unit 8, and then DFT spectrums are outputted through processing performed in the first signal processing unit 9 or the second signal processing unit 18.

In FIG. 2, the section (A) represents a knocking sensor signal NS that has been processed by the anti-alias LPF 5. The section (B) represents a knocking detection window signal WS; during the low-level duration thereof, the foregoing high-speed A/D conversion is performed by the high-speed A/D conversion unit 7. The section (C) represents the sampled values xs(0 to 159) of data obtained after the execution of a high-speed A/D conversion by the high-speed A/D conversion circuit 7.

The section (D) of FIG. 2 represents a data group consisting of serial segments each including thirty-two sampled values (the number of samples N=32), i.e., a predetermined number of sampled values obtained by dividing the sampled values xs(0 to 159) represented in the section (C). the data group including xs1 (=xs(0 to 31), xs3 (=xs(32 to 63), xs5 (=xs(64 to 95), xs7 (=xs(96 to 127), and xs9 (=xs(128 to 159) is a data group obtained by dividing the sampled values xs(0 to 159) every thirty-two sampled values, i.e., every predetermined number of sampled values. In addition, the number of samples N is not limited to 32.

In Embodiment 1, in order to raise the temporal accuracy of the time-frequency analysis, preparation is made not only for the foregoing data group including xs1, xs3, xs5, xs7, and xs9 but also for a data group including xs2 (=xs(16 to 47), xs4 (=xs(48 to 79), xs6 (=xs(80 to 111), and xs8 (=xs(112 to 143), which are obtained by dividing the sampled values every predetermined number, while shifting by N/2 the segment starting timing for each segment.

Figure 3:
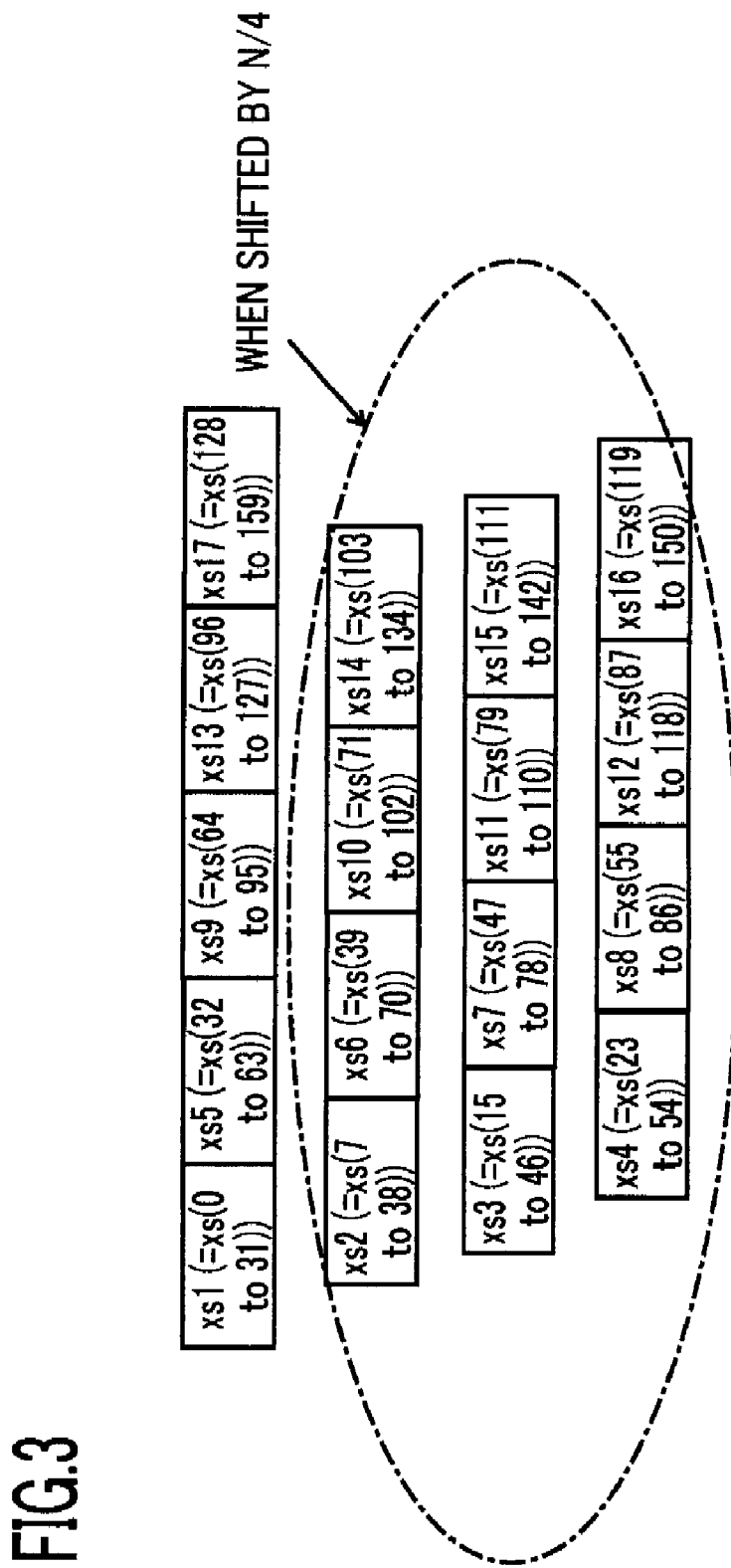
FIG. 3 is an explanatory chart representing another specific example of a time-frequency analysis according to Embodiment 1 of the present invention.

In addition, the shift amount of the segment starting timing is not limited to N/2; the temporal accuracy may further be raised by shifting the segment starting timing, for example, by N/4. FIG. 3 represents a case where the shift amount of the segment starting timing is set to N/4. In other words, In FIG. 3, the data group including xs1 (=xs(0 to 31), xs5 (=xs(32 to 63), xs9 (=xs(64 to 95), xs13 (=xs(96 to 127), and xs17 (=xs(128 to 159) is a data group obtained by dividing the sampled values xs(0 to 159) every thirty-two sampled values, i.e., the predetermined number of sampled values.

In the example represented in FIG. 3, the data group including xs2 (=xs(7 to 38), xs6 (=xs(39 to 70), xs10 (=xs(71 to 102), and xs14 (=xs(103 to 134), the data group including xs3 (=xs(15 to 46), xs7 (=xs(47 to 78), xs11 (=xs(79 to 110), and xs15 (=xs(111 to 142), and the data group including xs4 (=xs(23 to 54), xs8 (=xs(55 to 86), xs12 (=xs(87 to 118), and xs16 (=xs(119 to 150) are prepared, by dividing the sampled values every predetermined number, i.e., every thirty-two, while shifting by N/4 the respective segment starting timing of the data groups. In such a way as described above, the temporal accuracy can be enhanced.

Meanwhile, as represented in the section (D) of FIG. 2, preparation is made for a data group consisting of serial segments each including thirty-two sampled values (the number of samples N=32), i.e., the predetermined number of sampled values obtained by dividing the sampled values xs(0 to 159); in order to reduce an error caused by a frequency analysis in which sampled values are divided every predetermined sampled values, i.e., every thirty-two sampled values, the respective segments xs1 to xs9 are multiplied by a window function, as represented in the section (E) of FIG. 2. In Embodiment 1, as the window function, a Hanning Window represented by the equation (1) below is utilized. In addition, the window function is not limited to the Hanning Window.

$$w(n) = \frac{1}{2} - \frac{1}{2}\cos\left(\frac{2\pi n}{N-1}\right)(n=0, 1, 2, \ldots, N-1) \quad (1)$$

where w(n) is Hanning Window, and N is the number of samples.

For example, the calculation in which the segment xs1 is multiplied by the window function is performed in accordance with the equation (2) below. In addition, a set of bracketed characters in the equation (2) represents an array.

$$\begin{aligned}xsw1(n) &= xs1 \times w(n) \quad (2)\\ &= [xsw1(0), xsw1(1), xsw1(2), \ldots, xsw1(N-1)]\\ &= [xs(0) \times w(0), xs(1) \times w(1), xs(2) \times w(2), \ldots,\\ &\quad xs(N-1) \times w(N-1)]\end{aligned}$$

where xsw1(n) is a synthesis function (the result of multiplication of xs1 and the window function), and xsw1(0) to xsw1(N−1) are the array elements of xsw1(n).

After a calculation in which the respective segments xs1 to xs9 represented in the section (E) of FIG. 2 are multiplied by the window function is performed, the DFT is applied to each of the segments, as represented in the section (F) of FIG. 2, so that spectrums are calculated. For example, the calculation of spectrum in the case of xsw1(n) is represented in the equation (3) below:

$$xsS1(k) = \quad (3)$$

$$\sqrt{\left\{\sum_{n=0}^{N-1}xsw1(n)\cdot\cos\left(\frac{2\pi}{N}kn\right)\right\}^2 + \left\{\sum_{n=0}^{N-1}xsw1(n)\cdot\sin\left(\frac{2\pi}{N}kn\right)\right\}^2} \quad (n=0,1,2,\ldots,N-1) =$$

$$\sqrt{\begin{aligned}&\left\{xsw1(0)\cdot\cos(0)+xsw1(1)\cdot\cos\left(\frac{2\pi}{N}k\right)+xsw1(2)\cdot\\ &\cos\left(\frac{2\pi}{N}2k\right)+\Lambda+xsw1(N-1)\cdot\cos\left(\frac{2\pi}{N}(N-1)k\right)\right\}^2 + \\ &\left\{xsw1(0)\cdot\sin(0)+xsw1(1)\cdot\sin\left(\frac{2\pi}{N}k\right)+xsw1(2)\cdot\\ &\sin\left(\frac{2\pi}{N}2k\right)+\Lambda+xsw1(N-1)\cdot\sin\left(\frac{2\pi}{N}(N-1)k\right)\right\}^2\end{aligned}}$$

where xsS1(k) is the spectrum at a frequency $$\frac{k}{NT_s}$$

in the case where DTF is applied to xsw1(n); k is a variable related to the frequency (k=0, 1, 2, . . . , N−1); and $T_s$ is the sampling period for the sampled values xs.

As represented in the section (F) of FIG. 2, the respective time instants (crank angles) for the spectrums xsS1 to xsS9 after the execution of the DFT are set to timings that are positioned at the intermediate points of the segments of the data group including xs1 to xs9.

Referring to FIGS. 1A and 1B again, in the first signal processing unit 9, as described above, a time-frequency analysis in the first frequency bandwidth is performed, through DTF processing, on the data obtained after the execution of a high-speed A/D conversion by the high-speed A/D conversion circuit 7, in steps of a predetermined number of data pieces, and then the respective spectrums for the segments are calculated and outputted. The DFT spectrums outputted after the signal processing in the first signal processing unit 9 are inputted to a peak hold unit 10. The first peak hold unit 10 holds the peak values of the inputted spectrums. A first knocking determination threshold value calculation unit 11 calculates a knocking determination threshold value for a peak hold method (referred to as a P/H method, hereinafter) in the first frequency bandwidth, based on the spectral peak values obtained in the first peak hold unit 10. In addition, in Embodiment 1, a knocking determination threshold value according to the P/H method is calculated in accordance with the equations (4), (5), and (6) below; however, the method of calculating a knocking determination threshold value is not limited to the foregoing method.

A first filtering performed every SGT period (every 75° CA before the compression TDC of each cylinder) is calculated in accordance with the equation (4) below.

$$SPbgl1_{F1}(n) = SPbgl1_{F1}(n-1) - \frac{SPbgl1_{F1}(n-1) - SP_{F1}(n)}{K_{p1F1}} \quad (4)$$

where $SPbgl1_{F1}$ is the average value obtained through the first filtering in accordance with the P/H method in the first frequency bandwidth; $SP1_{F1}$ is the peak value of the spectrums in the first frequency bandwidth; $K_{P1F1}$ is the first-filter averaging coefficient (preliminarily stored in a ROM) in accordance with the P/H method in the first frequency bandwidth.

A second filtering performed every 10 [msec] is calculated in accordance with the equation (5) below.

$$SPbgl2_{F1}(n) = SPbgl2_{F1}(n-1) - \frac{SPbgl2_{F1}(n-1) - SP_{F1}(n)}{K_{p2F1}} \quad (5)$$

where $SPbgl2_{F1}$ is the average value obtained through the second filtering in accordance with the P/H method in the first frequency bandwidth, and $K_{P2F1}$ is the second-filter averaging coefficient (preliminarily stored in a ROM) in accordance with the P/H method in the first frequency bandwidth.

The knocking determination threshold value, which is obtained every SGT period, is calculated in accordance with the equation (6) below.

$$THP_{F1}(n) = SPbgl2_{F1}(n) \times K_{THPF1} + K_{OFSPF1} \quad (6)$$

where $THP_{F1}(n)$ is the knocking determination threshold value in accordance with the P/H method in the first frequency bandwidth; $K_{THPF1}$ is the threshold value coefficient (preliminarily stored in a ROM) in accordance with the P/H method in the first frequency bandwidth; $K_{OFSPF1}$ is the threshold value offset (preliminarily stored in a ROM) in accordance with the P/H method in the first frequency bandwidth.

The various kinds of coefficients in the equations (4), (5), and (6) are stored, for example, in a map in which the engine rotation speed and the engine load are utilized as parameters; the coefficients are changed in accordance with the engine driving condition. For example, in the case where, under a certain engine driving condition, the spectral peak value at the timing when knocking in the first frequency bandwidth occurs is smaller than the spectral peak value at the timing when noise occurs, i.e., in the case where erroneous knocking detection is often made, the offset for the threshold value according to the P/H method in the first frequency band width is set to a large value in the driving region, so that the knocking determination threshold value is made to be a maximal value.

In such a manner as described above, the knocking determination according to the P/H method in the first frequency bandwidth is substantially not performed in the driving region, so that frequent erroneous knocking detection can be prevented. The foregoing measures apply not only to the first frequency bandwidth but also to other frequency bandwidths, and apply not only to the P/H method but also to an integration method described later.

After, in such a manner as described above, the knocking determination threshold value according to the P/H method in the first frequency bandwidth is calculated in the first knocking determination threshold value calculation unit 11, a knocking detection amount according to the P/H method in the first frequency bandwidth is calculated in the first knocking detection amount calculation unit 12. In Embodiment 1 of the present invention, a knocking detection amount according to the P/H method is calculated in accordance with the equation (7) below. In addition, the method of calculating a knocking detection amount is not limited to the foregoing method.

$$VP_{F1}(n) = SP_{F1}(n) - THP_{F1}(n) \quad (7)$$

where $VP_{F1}(n)$ is the knocking detection amount in accordance with the P/H method in the first frequency bandwidth.

Next, a first knocking delay angle amount calculation unit 13 calculates a knocking delay angle amount for each ignition according to the p/H method in the first frequency bandwidth. In Embodiment 1, a knocking delay angle amount for each ignition according to the P/H method is calculated in accordance with the equation (8) below. In addition, the method of calculating a knocking delay angle amount for each ignition is not limited to the foregoing method.

$$\Delta\theta R_{PF1}(n) = 0 \text{—in the case where } VP_{F1}(n) \leq 0$$

(determined that no knocking exists)

$$\Delta\theta R_{PF1}(n) = \frac{VP_{F1}(n)}{THP_{F1}(n)} \times K_{gPF1} + 0.35° \ CA \leq \quad (8)$$

$$\Delta\theta_{PF1max} \ \ldots \ \text{in the case where } VP_{F1}(n) > 0$$

(determined that knocking exists)

where $\Delta\theta R_{PF1}(n)$ is the knocking delay angle amount for each ignition in accordance with the P/H method in the first frequency bandwidth; $K_{gPF1}$ is the delay angle amount reflection coefficient (preliminarily stored in a ROM) in accordance with the P/H method in the first frequency bandwidth; $\Delta\theta_{PF1max}$ is the knocking delay angle amount clipped value for each ignition (preliminarily stored in a ROM) in accordance with the P/H method in the first frequency bandwidth.

On the other hand, the DFT spectrums outputted from the first signal processing unit 9 are inputted to a first average value calculation unit 14, where the average value of the inputted spectrums is calculated. The processing, described below, performed in a second knocking determination threshold value calculation unit 15, a second knocking detection amount calculation unit 16, and a second knocking delay angle amount calculation unit 17 is a calculation, of an ignition-timing correction amount for each ignition, through an integration method; however, as described above, in the first average value calculation unit 14, not the integration value but the average value of the spectrums is calculated. The reason for that is to prevent a phenomenon that, because the number of data pieces to be A/D-converted at high speed during the low level duration of the knocking detection window signal changes depending on an engine driving condition, the number of spectrums outputted after the execution of the DFT changes, whereby, in the case where the integration value is simply calculated, the integration value varies depending on the number of spectrums.

Accordingly, in Embodiment 1 of the present invention, the average value of spectrums is calculated in the first average value calculation unit 14, and by utilizing the average value, calculation of an ignition-timing correction for each ignition is performed through an integration method described below.

The contents of the ignition-timing correction amount calculation for each ignition, through an integration method, performed in the first average value calculation unit 14, the second knocking determination threshold value calculation unit 15, the second knocking detection amount calculation unit 16, and the second knocking delay angle amount calculation unit 17 is the same as those of the foregoing processing performed in the first peak hold unit 10, the first knocking determination threshold value calculation unit 11, the second knocking detection amount calculation unit 12, and the second knocking delay angle amount calculation unit 13.

In other words, the second knocking determination threshold value calculation unit 15 calculates a knocking determination threshold value according to an integration method in the first frequency bandwidth, based on the average value of spectrums obtained in the first average value calculation unit 14. The equation (9) corresponds to the foregoing equation (4); however, as may be necessary, various kinds of coefficients and variables are changed to be utilized in the integration method in the first frequency bandwidth. In addition, the method of calculating a knocking determination threshold value is not limited to the foregoing method.

A first filtering performed every SGT period (every 75° CA before the compression TDC of each cylinder) is calculated in accordance with the equation (9) below.

$$SPbgl1_{F1}(n) = SPbgl1_{F1}(n-1) - \frac{SPbgl1_{F1}(n-1) - SP_{F1}(n)}{K_{p1F1}} \quad (9)$$

where $SPbgl\,1_{F1}$ is the average value obtained through the first filtering in accordance with the integration method in the first frequency bandwidth; $SP_{F1}$ is the average value of the spectrums in the first frequency bandwidth; $K_{P1F1}$ is the first-filter averaging coefficient (preliminarily stored in a ROM) in accordance with the integration method in the first frequency bandwidth.

A second filtering performed every 10 [msec] is calculated in accordance with the equation (10) below. The equation (10) corresponds to the foregoing equation (5); however, as may be necessary, various kinds of coefficients and variables are changed to be utilized in the integration method in the first frequency bandwidth.

$$SPbgl2_{F1}(n) = SPbgl2_{F1}(n-1) - \frac{SPbgl2_{F1}(n-1) - SP_{F1}(n)}{K_{p2F1}} \quad (10)$$

where $SPbgl\,2_{F1}$ is the average value obtained through the second filtering in accordance with the integration method in the first frequency bandwidth, and $K_{P2F1}$ is the second-filter averaging coefficient (preliminarily stored in a ROM) in accordance with the integration method in the first frequency bandwidth.

The knocking determination threshold value, which is obtained every SGT period, is calculated in accordance with the equation (11) below. The equation (11) corresponds to the foregoing equation (6); however, as may be necessary, various kinds of coefficients and variables are changed to be utilized in the integration method in the first frequency bandwidth.

$$THP_{F1}(n) = SPbgl2_{F1}(n) \times K_{THPF\,1} + K_{OFSPF\,1} \quad (11)$$

where $THP_{F1}(n)$ is the knocking determination threshold value in accordance with the integration method in the first frequency bandwidth; $K_{THPF\,1}$ is the threshold value coefficient (preliminarily stored in a ROM) in accordance with the integration method in the first frequency bandwidth; $K_{OFSPF\,1}$ is the threshold value offset (preliminarily stored in a ROM) in accordance with the integration method in the first frequency bandwidth.

After, in such a manner as described above, the knocking determination threshold value according to the integration method in the first frequency bandwidth is calculated in the second knocking determination threshold value calculation unit 15, a knocking detection amount according to the integration method in the first frequency bandwidth is calculated in the second knocking detection amount calculation unit 16. In Embodiment 1 of the present invention, a knocking detection amount according to the integration method is calculated in accordance with the equation (12) below. In addition, the method of calculating a knocking detection amount is not limited to the foregoing method.

$$VP_{F1}(n) = SP_{F1}(n) - THP_{F1}(n) \quad (12)$$

where $VP_{F1}(n)$ is the knocking detection amount in accordance with the integration method in the first frequency bandwidth.

Next, the second knocking delay angle amount calculation unit 17 calculates a knocking delay angle amount for each ignition according to the integration method in the first frequency bandwidth. In Embodiment 1, a knocking delay angle amount for each ignition according to the integration method is calculated in accordance with the equation (13) below. In addition, the method of calculating a knocking delay angle amount for each ignition is not limited to the foregoing method.

$$\Delta\theta R_{PF1}(n) = 0 \ldots \text{in the case where } VP_{F1}(n) \leq 0 \quad (13)$$
(determined that no knocking exists)

$$\Delta\theta R_{PF1}(n) = \frac{VP_{F1}(n)}{THP_{F1}(n)} \times K_{gPF1} + 0.35° \text{ C. } A \leq$$

$$\Delta\theta_{PF1max} \ldots \text{in the case where } VP_{F1}(n) > 0$$
(determined that knocking exists)

where $\Delta\theta R_{PF1}(n)$ is the knocking delay angle amount for each ignition in accordance with the integration method in the first frequency bandwidth; $K_{gPF\,1}$ is the delay angle amount reflection coefficient (preliminarily stored in a ROM) in accordance with the integration method in the first frequency bandwidth; $\Delta\theta_{PF1max}$ is the knocking delay angle amount clipped value for each ignition (preliminarily stored in a ROM) in accordance with the integration method in the first frequency bandwidth.

Next, in the second signal processing unit 18, as is the case with the first signal processing unit 9, a time-frequency analysis in the second frequency bandwidth is performed, through DTF processing, on the data obtained after the execution of a high-speed A/D conversion by the high-speed A/D conversion circuit 7, in steps of a predetermined number of data pieces, and then the respective spectrums for the data groups are calculated and outputted.

A calculation of a knocking delay angle amount for each ignition according to the P/H method in the second frequency bandwidth is performed in a second peak hold unit 19, a third knocking determination threshold value calculation unit 20, a third knocking detection amount calculation unit 21, and a third knocking delay angle amount calculation unit 22; however, because the calculation is the same as the foregoing calculation of a knocking delay angle amount for each ignition according to the P/H method in the first frequency bandwidth, the explanation therefor will be omitted.

A calculation of a knocking delay angle amount for each ignition according to the integration method in the second frequency bandwidth is performed in a second average value calculation unit 23, a fourth knocking determination threshold value calculation unit 24, a fourth knocking detection amount calculation unit 25, and a fourth knocking delay angle amount calculation unit 26; however, because the calculation is the same as the foregoing calculation of a knocking delay angle amount for each ignition according to the integration method in the first frequency bandwidth, the explanation therefor will be omitted.

Next, in a knocking delay angle amount maximal value calculation unit 27, the knocking delay angle amount for each ignition, among the respective knocking delay angle amounts that have been calculated in the first knocking delay angle amount calculation unit 13, the second knocking delay angle amount calculation unit 17, the third knocking delay angle amount calculation unit 22, and the fourth knocking delay angle amount calculation unit 26, that is maximal is calculated. Next, in a fifth knocking delay angle amount calculation unit 28, a knocking delay angle amount is calculated, based on the knocking delay angle amount for each ignition that is larger than the other knocking delay angle amounts calculated in the knocking delay angle amount maximal value calculation unit 27. In Embodiment 1, in the fifth knocking delay angle amount calculation unit 28, a knocking delayed angle amount is calculated in accordance with the equation (14) below. In addition, the method of calculating a knocking delay angle amount is not limited to the foregoing method.

$$\theta R(n) = \theta R(n-1) - \Delta\theta R(n) - K(\tau) \leq \theta_{max} \quad (14)$$

where $\theta R(n)$ is the knocking delay angle amount; $K(\tau)$ is a tailing amount (0.35° CA/$\tau$); $\tau$ is the time (retard restoration time, preliminarily stored in a ROM) corresponding to a knocking control advanced angle; $\theta_{max}$ is the maximal knocking delay angle amount (preliminarily stored in a ROM).

The engine ignition timing is corrected based on the knocking delay angle amount calculated in such a manner as described above.

As represented in the section (D) of FIG. 4, although, from the behavior TI of the ignition timing obtained after a knocking delay angle amount has been applied in the case where the present invention is utilized, it is determined, as from the behavior TP of the ignition timing obtained after a knocking delay angle amount has been applied in the case where the foregoing conventional technologies are utilized simply in combination with each other, that there exists knocking, the knocking delay angle amount decreases; thus, it is represented that the ignition timing obtained after the knocking delayed angle amount has been applied is not controlled toward the advanced angle side, whereby appropriate knocking control is performed.

As described above, the internal-combustion-engine control apparatus according to Embodiment 1 of the present invention is configured in the following manner:

A portion, of a signal outputted from a sensor for detecting an engine vibration or a cylinder inner pressure vibration, that appears within a knocking detection window is A/D-converted; preparation is made for a data group consisting of serial segments each including a predetermined number of the A/D-converted values and a data group consisting of serial segments each including the predetermined number of he A/D-converted values, the starting timing for the latter serial segments being shifted; a time-frequency analysis is applied to the data groups in a plurality of frequency bandwidths; the peak value and the integration value of spectrums, within the knocking detection window, outputted after the time/frequency analyses in each of the plurality of frequency bandwidths are calculated; a P/H method in which knocking determination is performed based on the peak value in each of the frequency bandwidths and an integration method in which knocking determination is performed based on the integration value in each of the frequency bandwidths can be performed; and in the case where knocking is detected through at least one of the P/H method and the integration method, the ignition timing is delayed in order to avoid the knocking. Therefore, knocking detectability can be enhanced regardless of the type of an engine, even though there exist some engines whose knocking detectability is raised when knocking control is performed based on the peak value of the spectrums in each of the frequency bandwidths, and there exist other engines whose knocking detectability is raised when knocking control is performed based on the integration value of the spectrums in each of the frequency bandwidths. Furthermore, regardless of a driving condition, knocking detectability can be enhanced.

The foregoing P/H method is to calculate a knocking detection amount by, in each of the frequency bandwidths, comparing the peak value with the knocking determination threshold value corresponding to the peak value; the foregoing integration method is to calculate a knocking detection amount by, in each of the frequency bandwidths, comparing the integration value with the knocking determination threshold value corresponding to the peak value. The respective knocking detection amounts are calculated in accordance with the P/H method and the integration method; in order to correct a knocking delay angle amount every ignition, respective knocking delay angle amounts for each ignition are calculated in accordance with the P/H method and the integration method in each of the frequency bandwidths, based on the knocking detection amounts; and knocking control is performed based on the knocking delay angle amount for each ignition that is largest among the calculated knocking delay angle amounts for each ignition. As a result, in the case where, through at least one of the P/H method and the integration method, it is determined that there exists knocking, the knocking delay angle amount becomes large, whereby the ignition timing can be delayed.

In the integration method, knocking determination is performed based on the average value of the spectrums, within the knocking detection window, outputted after the time/frequency analyses; therefore, unlike a case where the integration value is simply calculated, the phenomenon does not occur in which, because the number of data pieces to be A/D-converted at high speed during a low level duration of the knocking detection window signal changes depending on an engine driving condition, the number of outputted spectrums changes, whereby the integration value varies depending on the number of spectrums. As a result, an effect due to change in the number of spectrums can be suppressed.

In the case where the knocking determination threshold value is calculated, various kinds of coefficients are changed in accordance with an engine driving condition. In the case where, under a certain driving condition, an erroneous knocking detection is frequently made in the P/H method or the integration method in a certain frequency bandwidth, the various kinds of coefficients are set in such a way that the knocking determination threshold value corresponding to the method with which, under a certain driving condition, an erroneous knocking detection is frequently made in a certain frequency bandwidth becomes maximal, and no knocking determination is substantially made in accordance with the method with which, under a certain driving condition, an erroneous knocking detection is frequently made in a certain frequency, so that an erroneous knocking detection can be prevented from occurring frequently.

Various modifications and alterations of this invention will be apparent to those skilled in the art without departing from the scope and spirit of this invention, and it should be understood that this is not limited to the illustrative embodiments set forth herein.

What is claimed is:

1. An internal-combustion-engine control apparatus comprising:
   a sensor that detects a vibration of an engine or a cylinder inner pressure vibration and outputs a signal in accordance with the vibration;
   a signal processing unit that forms a first data group consisting of serial segments each including a predetermined number of digital values that are obtained by A/D-converting the signal outputted from the sensor and a second data group consisting of serial segments each including the predetermined number of digital values, the starting timing of each serial segment in the second data group being shifted from that of each serial segment in the first data group by a predetermined amount, and that applies respective time-frequency analysis processings to the first data group and the second data group in each of a plurality of frequency bandwidths so as to output spectrums based on the respective processings;
   a knocking determination unit that performs knocking determination based on the respective peak values of the spectrums outputted from the signal processing unit; and
   a knocking determination unit that performs knocking determination based on the respective integration values of the spectrums outputted from the signal processing unit,
   wherein, in the case where knocking is detected by at least one of the knocking determination unit that performs knocking determination based on the respective peak values and the knocking determination unit that performs knocking determination based on the respective integration values, an ignition timing for the engine is delayed.

2. The internal-combustion-engine control apparatus according to claim 1,
   wherein the knocking determination unit that performs knocking determination based on the respective peak values of the spectrums compares the peak values with a predetermined threshold value in each of the frequency bandwidths so as to calculate a knocking detection amount, and calculates a delay angle amount for each ignition of the engine in each of the frequency bandwidths, based on the calculated knocking detection amount,
   wherein the knocking determination unit that performs knocking determination based on the respective integration values of the spectrums compares the integration values with a predetermined threshold value in each of the frequency bandwidths so as to calculate a knocking detection amount, and calculates a delay angle amount for each ignition of the engine in each of the frequency bandwidths, based on the calculated knocking detection amount, and
   wherein knocking of the engine is controlled to be suppressed, based on the delay angle amount, among the respective delay angle amounts for each ignition calculated by the knocking determination units, that is maximal.

3. The internal-combustion-engine control apparatus according to claim 2, wherein the predetermined threshold value to be compared with the peak value and the predetermined threshold value to be compared with the integration value are calculated based on coefficients that are changed in accordance with a driving condition of the engine, and the coefficients are set in such a way that the threshold values become maximal for a frequency bandwidth in which an erroneous knocking detection is frequently made.

4. The internal-combustion-engine control apparatus according to claim 1,
   wherein the signal processing unit forms the first data group consisting of serial segments each including a predetermined number of digital values that are obtained by A/D-converting the signal outputted from the sensor and the second data group consisting of serial segments each including the predetermined number of digital values, the starting timing of each serial segment in the second data group being shifted from that of each serial segment in the first data group by a predetermined amount, and includes a first signal processing unit that applies respective time-frequency analysis processings to the first data group and the second data group in a first frequency bandwidth so as to output spectrums based on the respective processings; and a second signal processing unit that forms a first data group consisting of serial segments each including a predetermined number of digital values that are obtained by A/D-converting the signal outputted from the sensor and a second data group consisting of serial segments each including the predetermined number of digital values, the starting timing of each serial segment in the second data group being shifted from that of each serial segment in the first data group by a predetermined amount, and that applies respective time-frequency analysis processings to the first data group and the second data group in a second frequency bandwidth so as to output spectrums based on the respective processings,
   wherein the knocking determination unit that performs knocking determination based on the respective peak values includes a first knocking determination unit that performs knocking determination based on the respective peak values of the spectrums outputted from the first signal processing unit; and a second knocking determination unit that performs knocking determination based on the respective peak values of the spectrums outputted from the second signal processing unit, and
   wherein the knocking determination unit that performs knocking determination based on the respective integration values includes a third knocking determination unit that performs knocking determination based on the respective integration values of the spectrums outputted from the first signal processing unit; and a fourth knocking determination unit that performs knocking determination based on the respective integration values of the spectrums outputted from the second signal processing unit.

5. The internal-combustion-engine control apparatus according to claim 4,
wherein the knocking determination unit that performs knocking determination based on the respective peak values includes a first delay angle amount calculation unit that compares the respective peak values of the spectrums outputted from the first signal processing unit with a predetermined threshold value so as to calculate a knocking detection amount, and calculates a delay angle amount for each ignition of the engine in the first frequency bandwidth, based on the calculated knocking detection amount; and a third delay angle amount calculation unit that compares the respective peak values of the spectrums outputted from the second signal processing unit with a predetermined threshold value so as to calculate a knocking detection amount, and calculates a delay angle amount for each ignition of the engine in the second frequency bandwidth, based on the calculated knocking detection amount, and
wherein the knocking determination unit that performs knocking determination based on the respective integration values includes a second delay angle amount calculation unit that compares the respective integration values of the spectrums outputted from the first signal processing unit with a predetermined threshold value so as to calculate a knocking detection amount, and calculates a delay angle amount for each ignition of the engine in the first frequency bandwidth, based on the calculated knocking detection amount; and a fourth delay angle amount calculation unit that compares the respective integration values of the spectrums outputted from the second signal processing unit with a predetermined threshold value so as to calculate a knocking detection amount, and calculates a delay angle amount for each ignition of the engine in the second frequency bandwidth, based on the calculated knocking detection amount.

6. The internal-combustion-engine control apparatus according to claim 5, wherein knocking of the engine is controlled to be suppressed, based on the delay angle amount, among the respective delay angle amounts for each ignition calculated by the knocking determination units, that is maximal.

7. The internal-combustion-engine control apparatus according to claim 5, wherein the predetermined threshold value to be compared with the peak value and the predetermined threshold value to be compared with the integration value are calculated based on coefficients that are changed in accordance with a driving condition of the engine, and the coefficients are set in such a way that the threshold values become maximal for a frequency bandwidth in which an erroneous knocking detection is frequently made.

8. The internal-combustion-engine control apparatus according to claim 1, wherein the A/D conversion is applied to a portion, of the signal outputted from the sensor, within a predetermined knocking detection window.

9. The internal-combustion-engine control apparatus according to claim 8, wherein the time-frequency analysis processing in each of the frequency bandwidths is applied to the A/D-converted signal, through a discrete Fourier transformation.

10. The internal-combustion-engine control apparatus according to claim 1, wherein the knocking determination unit that performs knocking determination based on the respective integration values performs knocking determination, based on the average value of the spectrums.

* * * * *